F. B. GRAHAM.
ANIMAL BREEDER'S BAG.
APPLICATION FILED NOV. 7, 1907.
899,251.
Patented Sept. 22, 1908.
2 SHEETS—SHEET 1.
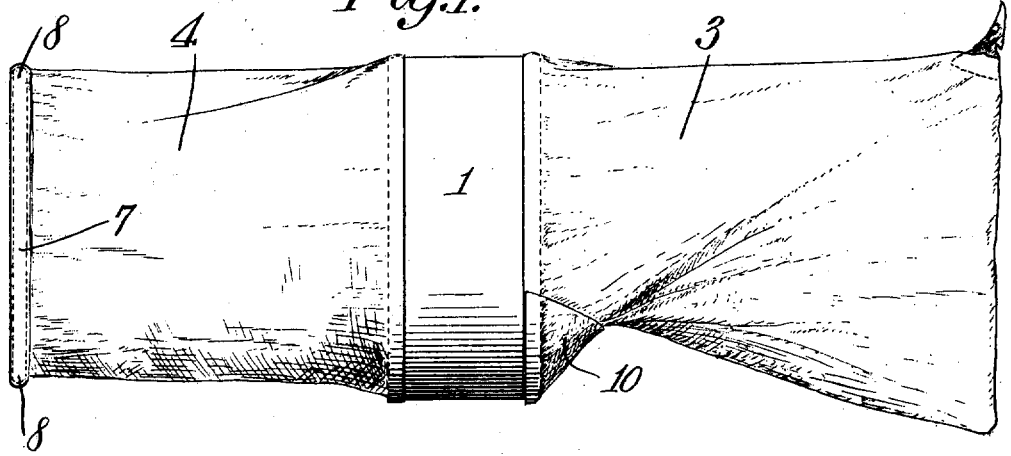
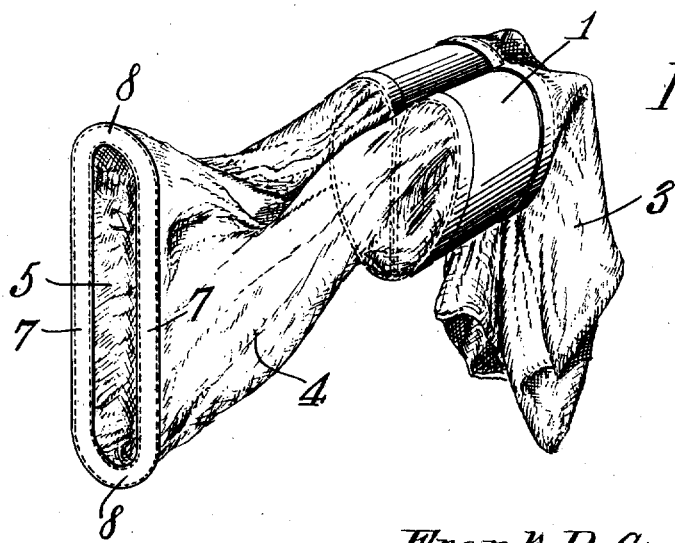
Frank B. Graham,
Inventor
Witnesses
By C. A. Snow & Co.
Attorneys F. B. GRAHAM.
ANIMAL BREEDER'S BAG.
APPLICATION FILED NOV. 7, 1907.
899,251.
Patented Sept. 22, 1908.
2 SHEETS—SHEET 2.
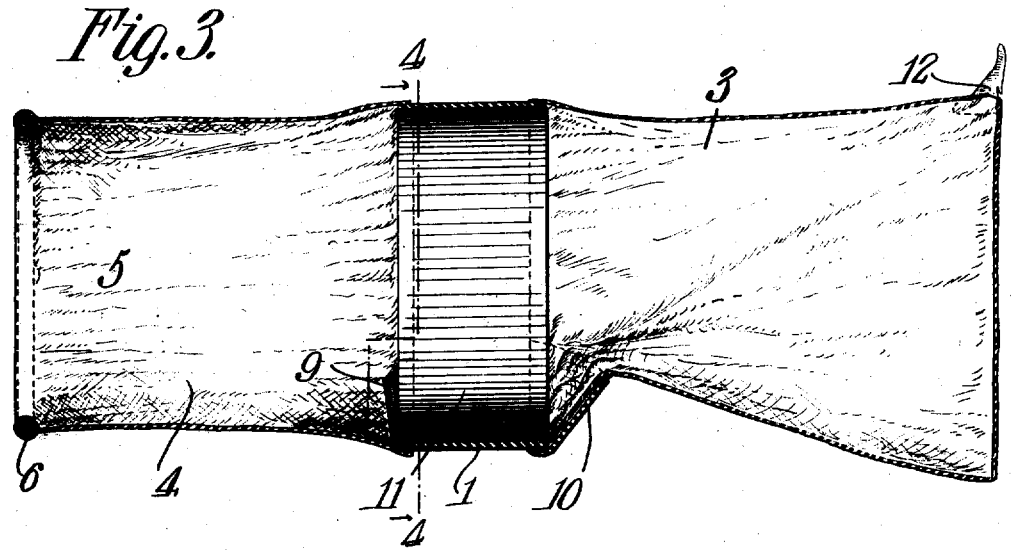
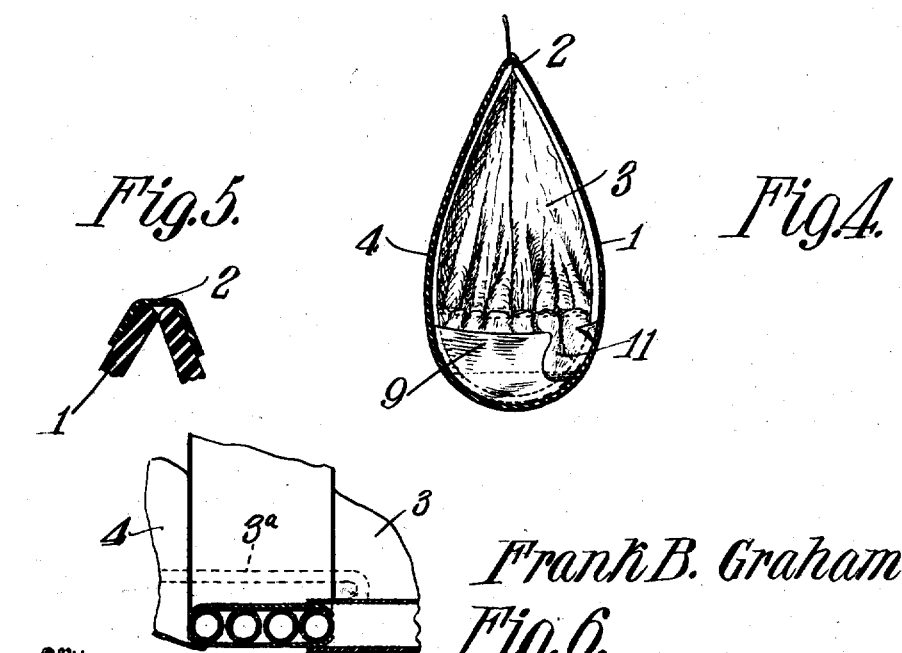
Frank B. Graham,
Inventor

UNITED STATES PATENT OFFICE.

FRANK BRUCE GRAHAM, OF GARNETT, KANSAS.

ANIMAL-BREEDER'S BAG.

No. 899,251.     Specification of Letters Patent.     Patented Sept. 22, 1908.

Application filed November 7, 1907. Serial No. 401,138.

*To all whom it may concern:*

Be it known that I, FRANK BRUCE GRAHAM, a citizen of the United States, residing at Garnett, in the county of Anderson and State of Kansas, have invented a new and useful Animal-Breeder's Bag, of which the following is a specification.

This invention relates to an article for the use of animal breeders; and has for its object to provide a receptacle of such size, shape and construction as to readily permit its insertion within the vagina of a female, there to remain during and after the period of coition for the purpose of retaining the semen of the male in a fecund condition for use in artificial impregnation.

It is known that under proper conditions of heat, such as obtain within the vagina, semen retains its vitality for about two weeks, a provision of nature to insure impregnation should the female organs at the time of the natural act not be in a properly advanced condition, the ovum backward in its descent, or for some cause, the spermatozoids fail to enter the uterus. For the actual process of germination, an exceedingly small quantity of semen is required, but to overcome the conditions above noted and others, a comparatively large quantity is ejected by the male, which remains in the vagina for a longer or shorter period of time ready to start germination as soon as the proper moment arrives. It will thus be observed that a very large quantity of semen is lost to use for propagating purposes, and it is to preserve this wasted vital fluid that the invention is designed.

The article consists in part of a receptacle made of an elastic flexible material, such as soft rubber, in the form of a bag with one end open. This bag is introduced into the vagina of a female with its open end outward, the latter provided with a flexible frame or binding which rests against the vulva and prevents the entire receptacle from passing within the animal. Intermediate its length, the receptacle is reinforced by a band of less yielding material, approximately ovoid in form, which retains its shape when *in situ* and prevents the walls of the vagina from collapsing the bag or receptacle. Within the band is a pocket for retaining all the semen injected, where it remains in perfect safety and in convenient position to be withdrawn at any time, within the period of its fecundity, in large or small quantities by a syringe or other means, for immediate use, or for filling capsules and receptacles kept at the proper temperature to be sent to a distance for artificial propagation.

In the accompanying drawings, Figure 1 is a side elevation of the bag or receptacle extended. Fig. 2 is a perspective view of the same partly folded for insertion into the vagina. Fig. 3 is a longitudinal vertical sectional view of the bag. Fig. 4 is a cross sectional view on the line 4—4 of Fig. 3. Fig. 5 is a view in section of a detail. Fig. 6 is a sectional view showing in detail a modification.

Similar numerals of reference are used for the same parts on all the figures.

The numeral 1 indicates a band of uniform width made of stout resilient material such as solid rubber, or an inflatable tube or tubes, of an approximate ovoid form with a narrow thin portion 2 extending across the band at the top, bottom, or one side whereby the band may be folded into smaller compass to permit its introduction into the vagina of an animal. After placing in position, the band is opened out to its normal shape and expands the vagina in its vicinity and keeps it spread, the stiffness of the band being great enough for this purpose, but sufficiently resilient to yield and permit the passage of the male organ.

Cemented or otherwise securely fastened to the inner edge of the band 1 is a bag-like extension 3 made by preference of quite thin and soft sheet rubber of one or two thicknesses, with a pneumatic connection 3ª, if desired, when two thicknesses are employed see Fig. 6. On the outer edge of the band 1 is cemented a tube 4 also made of thin soft rubber but slightly thicker, by preference, than that forming the extension 3. The outer open end 5 of the tube is secured to an open resilient metal or rubber frame 6 sufficiently rigid to retain its shape under normal conditions, but yieldable laterally when occasion demands. The frame 6 may be made in various shapes, one of which is shown in Fig. 2, and as there represented, it has straight parallel vertically disposed sides 7 joined at the top and bottom by semicircular ends 8, its vertical dimension being much greater than its width. In cross section the substance of the frame is circular, elliptical or such other shape as will preclude all sharp corners or edges.

The shape of the band 1 may vary to suit the animal in which it is applied, that shown in the drawing and described as approximately ovoid, varies from a true ovoid by coming to an edge at the top where the thin portion 2 is placed. Across the lower curved part of the band 1 and within the tube 4 is cemented to the outer edge of the band a strip 9 of thin rubber, forming a tight partition between the bottom of the band 1 and the tube 4. A similar strip 10, but a little higher, reaches across the inner side of the bottom of the band outside the extension 3, the lower part of the latter therefore is thrown into folds as it falls over the edge of the inner strip. A pocket 11 is thus formed at the bottom of the band between the two strips in which the semen collects, its escape therefrom being prevented by the outer strip or partition 9. At the upper part of the bag-like extension 3 next its closed inner end is a small hole 12 through which may be passed the nozzle of a syringe to impregnate the animal wearing the bag.

To use the above described breeder's bag, the band 1 is depressed from its upper thin edge until the latter strikes the bottom forming thereby a conventional heart shaped figure clearly seen in dotted lines in Fig. 2. The height of the band is thus greatly reduced and its width may be lessened by external compression. The bag-like extension 3 is gathered within the band either before or after folding the latter, to prevent it getting between the band and the walls of the vagina. The hand may now be placed in the tubular end 4 through the opening 5 and the central folded parts of the band 1 grasped by the hand and the band introduced into the vagina and carried forward until the thickened open end 5 of the tubular part 4 reaches the vulva. The band is then opened out until it assumes its normal shape within the vagina, keeping the walls of a portion of the latter separated and having a clamping effect upon them so that the band cannot move from its place. The bag-like extension 3 may be carried farther into the vagina if desired or it may be retained within the band 1 in such manner that the male organ will strike the center of the closed end of said extension to take the strain off the thin material of which it is made. After coition, the lower side of the extension 3 is raised to permit the semen to run from it into the pocket 11 where it is retained as before described by the cross strips 9 and 10. As the strip 10 is outside the extension 3 and holds up the bottom of the latter near the band the semen readily escapes into the pocket.

An animal may wear this bag with perfect safety to herself and the semen for a number of days after being served, and work as usual while wearing it.

Having described my invention, what I claim as new and desire to secure by Letters-Patent is:—

1. A receptacle closed at its inner end adapted to be inserted within the vagina to receive and retain semen, and having means for holding it in place therein.

2. A receptacle closed at its inner end adapted to be inserted within the vagina to receive and retain semen and resilient means for holding said receptacle therein.

3. An elastic receptacle closed at its inner end adapted to be inserted within the vagina to receive and retain semen, and a resilient band for clamping said receptacle against the wall of the vagina.

4. A bag-like receptacle made of thin elastic material adapted to be placed within the vagina for receiving and retaining semen, and a resilient band made of heavier material intermediate the ends of said receptacle for clamping it against the wall of the vagina.

5. A receptacle for receiving and retaining semen adapted to be folded for insertion into the vagina and unfolded and clamped therein.

6. A thin elastic bag-like receptacle for receiving and retaining semen and having a resilient surrounding band collapsible and foldable upon itself, said receptacle adapted to be inserted into the vagina and the band unfolded therein to form a clamp.

7. A bag-like receptacle adapted to be inserted within the vagina, means for holding it therein, and a pocket within the receptacle to receive and retain semen.

8. A bag-like receptacle adapted to be inserted within the vagina, a resilient band surrounding said receptacle and forming a retaining clamp, and a pocket within said receptacle at the bottom of the band.

9. A thin elastic bag-like receptacle adapted to be inserted into the vagina, a resilient band intermediate its ends having a curved bottom, and forming a retaining clamp, and elastic strips extending across the inner and outer edges of said band to form a pocket at the bottom thereof.

10. An article of the class described comprising a flat yielding, approximately ovoid shaped band, having a thin elastic bag secured to one edge and a tube of like material fastened to its other edge with a thickened binding on the open exterior end of the tube.

11. An article of the class described comprising a flat, yielding, approximately ovoid shaped band having a thin elastic bag secured to one edge and a tube of like material fastened to its other edge a thickened binding surrounding the open outer end of said tube, and an elastic strip extending across the lower end of the band to raise the bag near its connection to said band.

12. An article of the class described comprising a flat, yielding, approximately ovoid shaped band having an elastic bag continuous with one edge and a tube continuous with its other edge, an elastic strip extending across the bottom of the band to form an interior partition between it and said tube, and a similar strip extending across the bottom of the band exterior to the attached bag, the two strips forming a pocket at the bottom of the band.

13. A breeder's bag comprising a bag made of thin elastic material having an elongated open mouth with thickened and stiffened but yielding edges and a thickened flat resilient band of ovoid shape having a narrow thin portion crossing it to permit it to collapse and fold for the purpose described, and a pocket at the bottom of said band.

14. A breeder's bag comprising a bag made of thin elastic material having an elongated open mouth with thickened and stiffened but yielding edges and a thickened flat resilient band of ovoid form with an edge like top thinner than the rest of the band to permit it to collapse and fold for the purpose described, and a pocket in the bottom of the band, said bag having a small opening at its closed end through which an instrument may be passed from the interior of the bag.

15. A breeder's bag comprising a bag made of thin elastic material having a flat resilient retaining band for fastening said bag within the vagina, and an elongated partly open mouth having thickened and stiffened edges to prevent the bag from passing wholly within the vagina but made sufficiently yielding as not to interfere with the natural act.

In testimony that I claim the foregoing as my own, I have hereto affixed my signature in the presence of two witnesses.

FRANK BRUCE GRAHAM.

Witnesses:
WM. T. DE HAVEN,
T. G. BRUNSON.